United States Patent [19]

Takai

[11] Patent Number: 4,994,338
[45] Date of Patent: Feb. 19, 1991

[54] ELECTROPHOTOGRAPHIC PHOTOSENSITIVE LAYER CONTAINING AZO PIGMENT WITH COUPLER RESIDUE HAVING PHENOLIC HYDROXYL GROUP

[75] Inventor: Hideyuki Takai, Yokohama, Japan

[73] Assignee: Canon Kabushiki Kaisha, Tokyo, Japan

[21] Appl. No.: 355,643

[22] Filed: May 23, 1989

[30] Foreign Application Priority Data

May 23, 1988 [JP] Japan ................................ 63-123844

[51] Int. Cl.$^5$ ............................................... G03G 5/06
[52] U.S. Cl. ......................................... 430/76; 430/77
[58] Field of Search ....................... 430/72, 73, 74, 76, 430/77

[56] References Cited

U.S. PATENT DOCUMENTS 4,612,271 9/1986 Makino et al. ........................ 430/73
4,737,430 4/1988 Kinoshita et al. .................... 430/72

*Primary Examiner*—John Goodrow
*Attorney, Agent, or Firm*—Fitzpatrick, Cella, Harper & Scinto

[57] ABSTRACT

An electrophotographic photosensitive material includes a photosensitive layer which is formed on a conductive support body and which contains an azo pigment expressed by Formula (1) described below, wherein at least one Cp in the Formula (1) is a coupler residue expressed by Formula (2) described below.

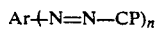

(1)

wherein Ar is an aromatic hydrocarbon or aromatic heterocyclic group, Cp is a coupler reside having a phenolic hydroxyl group, and n is an integer of 1, 2, 3 or 4.

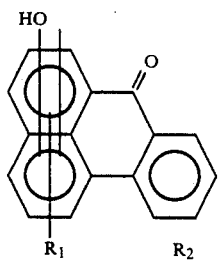

(2)

wherein $R_1$ and $R_2$ each is a hydrogen atom, an alkyl group, an alkoxy group, a halogen atom, a halomethyl group, a cyano group or a nitro group.

12 Claims, No Drawings

ELECTROPHOTOGRAPHIC PHOTOSENSITIVE LAYER CONTAINING AZO PIGMENT WITH COUPLER RESIDUE HAVING PHENOLIC HYDROXYL GROUP

BACKGROUND OF THE INVENTION

1. Field of the Invention

The present invention relates to an electrophotographic photosensitive material, and particularly to an electrophotographic photosensitive material containing an azo pigment having a coupler component with a particular structure.

2. Related Art of the Invention

Hitherto, electrophotographic photosensitive materials which include selenium, cadmium sulfide or zinc oxide have been widely known as materials containing inorganic photoconductive substances.

On the other hand, known electrophotographic photosensitive materials in which organic photoconductive substances are used include materials containing low-molecular organic photoconductive substances, such as photoconductive polymers represented by poly-N-vinylcarbazole, 2,5-bis(p-diethylaminophenyl)-1,3,4-oxazole and the like, and materials comprising combinations of these organic photoconductive substances and various types of dyes and pigments.

Electrophotographic photosensitive materials in which organic photoconductive substances are used have certain advantages in that they exhibit good properties with respect to film formation and a very high degree of productivity. Further, they can be produced by employing a coating process and are capable of providing inexpensive photosensitive materials. Since such electrophotographic photosensitive materials also offer the advantage that their color sensitivity can be freely controlled by appropriately selecting sensitizers used, such as dyes and pigments, their use has been investigated in a wide range of fields. In particular, function separated photosensitive materials have been recently developed in which an organic photoconductive pigment is used in a charge generation layer and a charge transport layer comprising the above described photoconductive polymer or low-molecular organic conductive substance is laminated thereon. Thus, significant improvements have been achieved with respect to sensitivity and durability, which are properties unsatisfactory with conventional organic electrophotographic photosensitive materials.

Many types of pigments for use in this type of photosensitive material have been proposed. Azo pigments have been widely investigated because such pigments have various beneficial properties and can be easily synthesized by combining amine components and coupler components. However, azo pigments involve certain problems with respect to their sensitivity and potential stability when put to repeated use, and thus only few of such pigments have been brought into practical use.

Examples of known coupler components which are used in such azo pigments include naphthol AS couplers, as disclosed in Japanese Patent Laid-Open No. 37543/1972 and the like, benzcarbazole couplers, as disclosed in Japanese Patent Laid-Open No. 122967/1983 and the like, naphthalimide couplers, as disclosed in Japanese Patent Laid-Open No. 79632/1979, perinone couplers and others.

SUMMARY OF THE INVENTION

As a result of research conducted by the inventors on novel coupler components with a view to resolving the above-described problems, the inventors found that an electrophotographic photosensitive material containing an azo pigment having a hydroxybenzanthrone compound as a coupler component exhibits excellent sensitivity and potential stability when put to repeated use.

Accordingly, it is an object of the present invention to provide an electrophotographic photosensitive material which is practical high sensitivity and exhibits potential stability when put to repeated use.

The present invention provides an electrophotographic photosensitive material comprising a photosensitive layer which contains an azo pigment expressed by Formula (1) given below and which is formed on a conductive substrate, the electrophotographic photosensitive material being characterized in that at least one of the Cp groups in Formula (1) is a coupler residue expressed by Formula (2).

$$Ar(-N=N-N=N-Cp)_n \quad (1)$$

In Formula (1) Ar is an aromatic hydrocarbon group or aromatic heterocyclic group, Cp is a coupler residue having a phenolic hydroxy group and n is an integer of 1, 2 3 or 4.

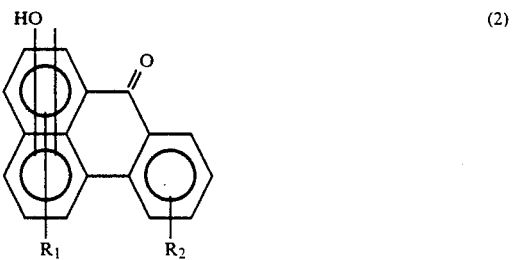

(2)

In Formula (2) $R_1$ and $R_2$ are each a hydrogen atom, an alkyl group, an alkoxy group, a halogen atom, a halomethyl group, a cyano group or a nitro group.

DETAILED DESCRIPTION OF THE INVENTION

Examples of the aromatic hydrocarbon and heterocyclic group, Ar, in the azo group expressed by Formula (1) include aromatic hydrocarbon groups such as benzene, naphthalene, fluorene, phenanthrene, anthracene, pyrene and the like; aromatic heterocyclic groups such as furan, thiophene, pyridine, indole, benzothiazole, carbazole, acridone, dibenzothiophene, benzoxazole, benzotriazole, oxadiazole, thiazole and the like; and groups in which the above-described aromatic rings are directly coupled to each other. Further, the Ar groups can be coupled through aromatic groups or non-aromatic coupling groups. The Ar groups can be fused to or bonded to such aromatic non-aromatic coupling groups to form compounds such as triphenylamine, diphenylamine, N-methyldiphenylamine, biphenyl, terphenyl, binaphthyl, fluorene, phenanthrenequinone, anthraquinone, benzanthrone, diphenyloxadiazole, phenylbenzoxazole, diphenylmethane, diphenyl sulfone, diphenyl ether, benzophenone, stilbene, distyrylbenzene, cyanostilbene, tetraphenyl-p-phenylenediamine, tetraphenylbenzidine and the like.

The above-described aromatic hydrocarbon groups or aromatic heterocyclic groups (Ar) may contain substituent groups. Examples of substituent groups include alkyl groups, such as methyl, ethyl, propyl, butyl and the like; alkoxy groups such as methoxy, ethoxy and the like; dialkylamino groups such as dimethylamino, diethylamino and the like; halogen atoms such as a fluorine atom, chlorine atom, bromine atom and the like; a hydroxyl group; a nitro group; a cyano group; halomethyl group; and the like.

Examples of structures of Ar that are particularly preferable include the following:

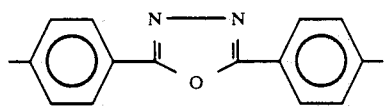

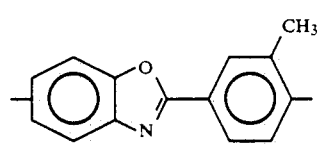

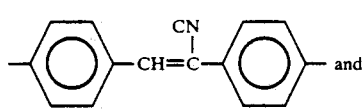 and

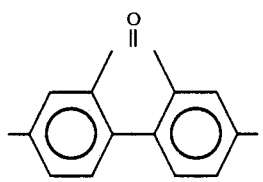

Examples of R$_1$ and R$_2$ in Formula (2) include a hydrogen atom; a cyano group; a nitro group; alkyl groups such as methyl, ethyl, propyl and the like; alkoxy groups such as methoxy, ethoxy and the like; halogen atoms such as a fluorine atom, a chlorine atom, a bromine atom and the like; halomethyl groups such as trifluoromethyl and the like.

A typical structure of such an azo pigment is expressed by the following Formula (3):

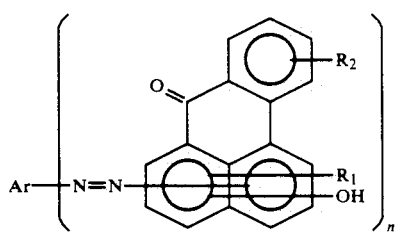

(3)

wherein Ar and n each denotes the same as that described above.

Examples of coupler residues that may coexist with a coupler residue expressed by Formula (2) in Cp in Formula (1) include coupler residues having structures expressed by the following Formulae (4) to (8):

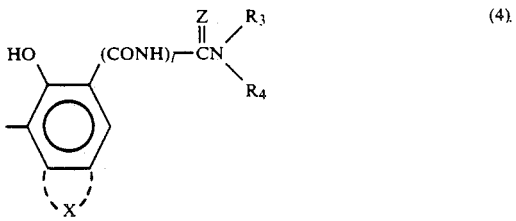

(4)

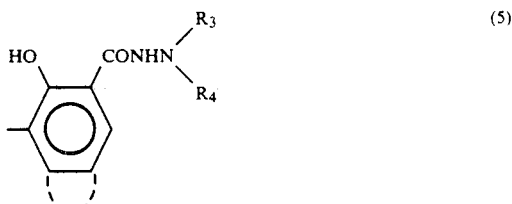

(5)

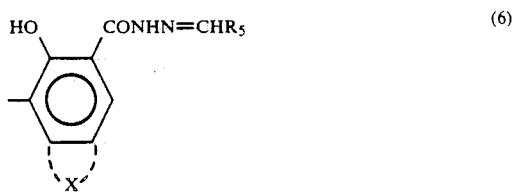

(6)

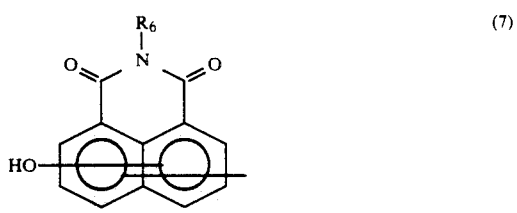

(7)

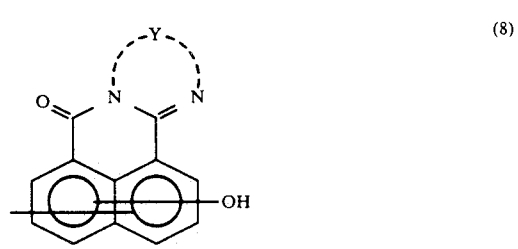

(8)

In each of Formulae (4), (5) and (6),

X denotes a residue, which is required for forming a naphthalene ring, anthracene ring, carbozole ring, benzcarbazole ring, dibenzofuran ring or the like, which is fused to the benzene ring.

R$_3$ and R$_4$ each denotes a hydrogen atom, an alkyl group, an aryl group, aralkyl group, a heterocyclic group or a cyclic amino group containing the nitrogen atom which joins with R$_3$ and R$_4$, and R$_5$ denotes a hydrogen atom, an alkyl group, an aryl group, an aralkyl group or a heterocyclic group.

R$_6$ denotes an alkyl group, an aryl group, an aralkyl group or a heterocyclic group, Z denotes an oxygen atom or a sulfur atom, and l denotes 0 or 1.

Y denotes a bivalent aromatic hydrocarbon group or bivalent heterocyclic group containing a nitrogen atom in the ring thereof.

Examples of groups denoted by Y include o-phenylene, o-naphthylene, perinaphthylene, 1,2-anthrylene, 3,4-pyrazolediyl, 2,3-pyridinediyl, 4,5-pyridinediyl, 6,7-indazolediyl, 6,7-quinolinediyl and the like.

Examples of the above-described alkyl group include a methyl, ethyl, propyl and butyl group and the like. Examples of the aralkyl group include a benzyl, phenethyl and naphthylmethyl group and the like. Examples of the heterocyclic group include a pyridyl, thienyl, furyl, thiazolyl, carbazolyl, dibenzofuryl, benzoimidazolyl and benzothiazolyl group and the like. Examples of the cyclic amino group containing the nitrogen atom in the ring thereof include cyclic amino groups derived from pyrrole, pyrroline, pyrrolidine, pyrrolidone, indole, indoline, isoindole, carbazole, benzoindole, imidazole, pyrazole, pyrazoline, oxazine, phenoxazine, benzocarbazole and the like.

The groups X, Y and $R_3$ to $R_6$ may have substituent groups. Examples of substituent groups include alkyl groups such as methyl, ethyl, propyl and the like; alkoxy groups such as methoxy, ethoxy and the like; substituted amino groups such as diethyl amino, dimethylamino and the like; halogen atoms such as a fluorine atom, a chlorine atom, bromine atom and the like; a phenylcarbamoyl group; a nitro group; a cyano group; halomethyl groups such as a trifluoromethyl group and the like.

Typical examples of the azo pigment used in the present invention are as follows:

Pigment Example (1-1)

A: 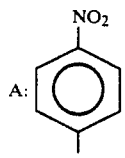

A': 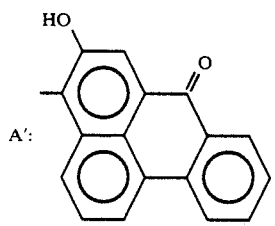

PIGMENT EXAMPLE (1-2)

A: 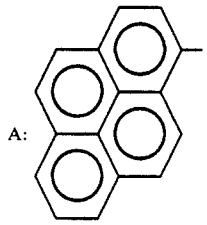

A': 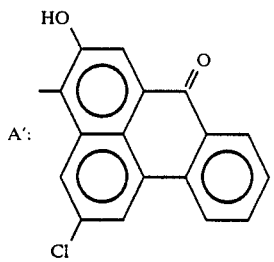

PIGMENT EXAMPLE (1-3)

A: 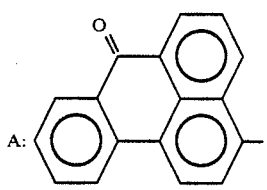

A': 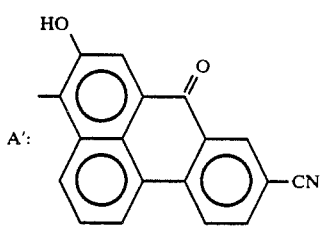

PIGMENT EXAMPLE (2-1)

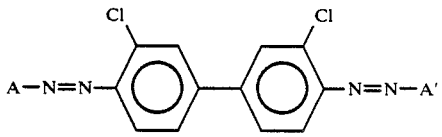

A, A': 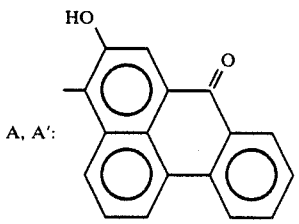

PIGMENT EXAMPLE (2-2)

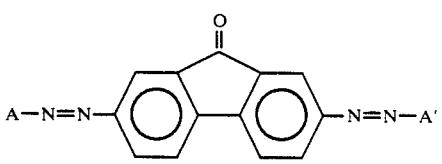

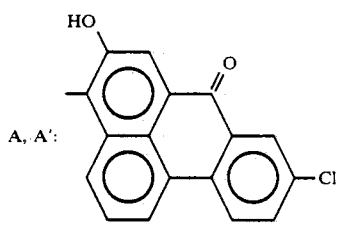
PIGMENT EXAMPLE (2-3)
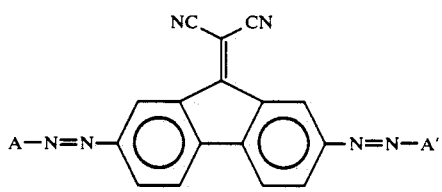
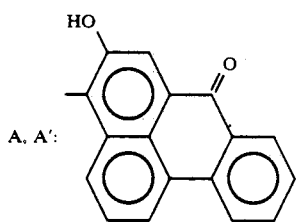
PIGMENT EXAMPLE (2-4)
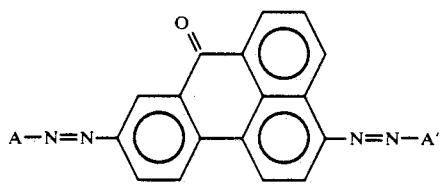
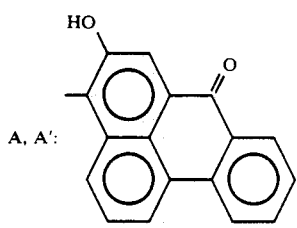
PIGMENT EXAMPLE (2-5)
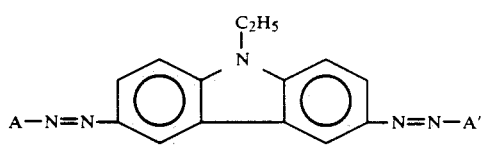
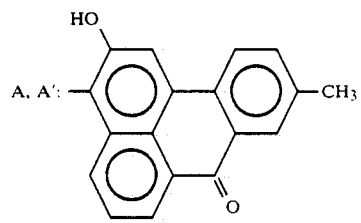
PIGMENT EXAMPLE (2-6)
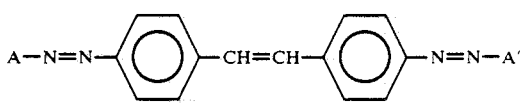
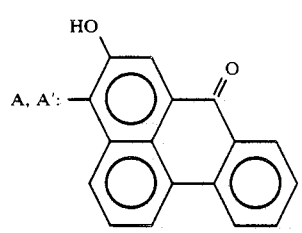
PIGMENT EXAMPLE (2-7)
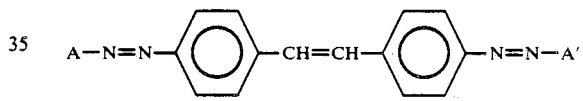
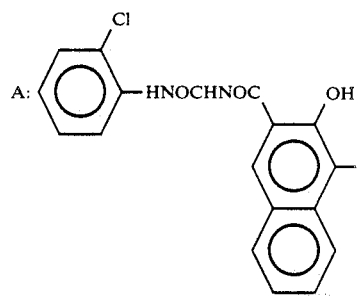
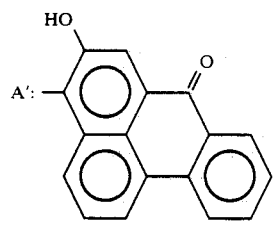
PIGMENT EXAMPLE (2-8)
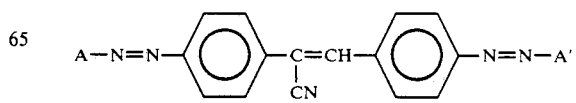

PIGMENT EXAMPLE (2-12)
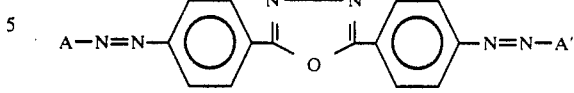
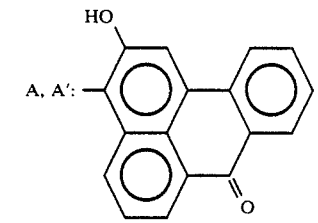
-continued
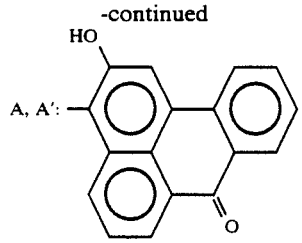
PIGMENT EXAMPLE (2-9)
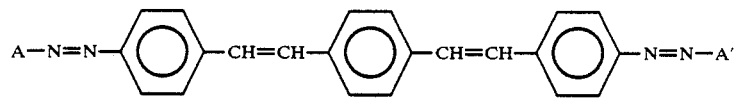
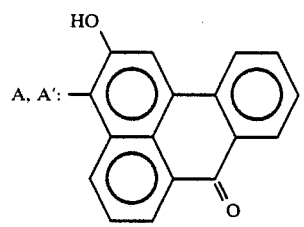
PIGMENT EXAMPLE (2-10)
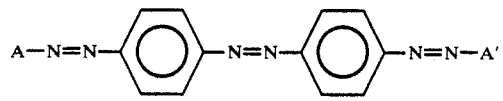
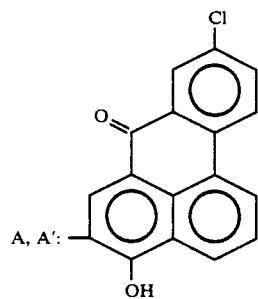
PIGMENT EXAMPLE (2-13)
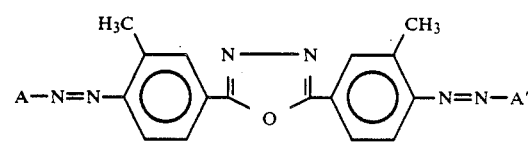
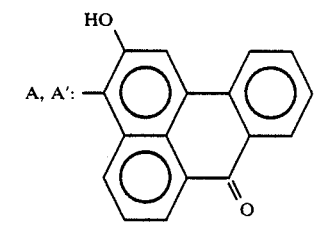
PIGMENT EXAMPLE (2-11)
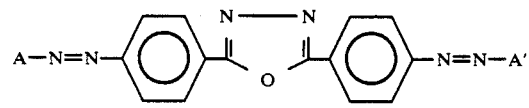
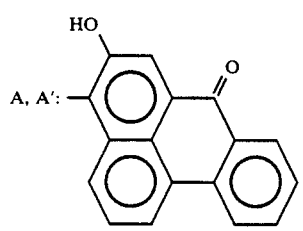
PIGMENT EXAMPLE (2-14)
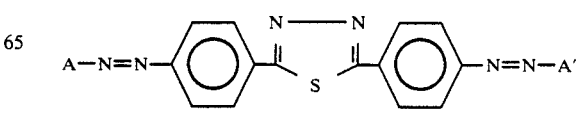

-continued
A, A':
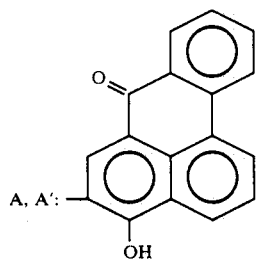
PIGMENT EXAMPLE (2-15)
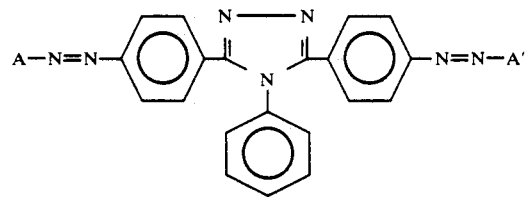
A:
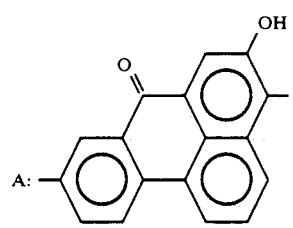
A':
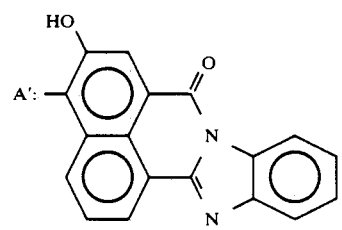
PIGMENT EXAMPLE (2-16)
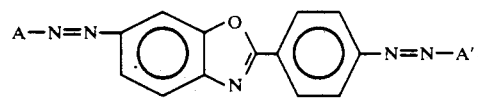
A, A':
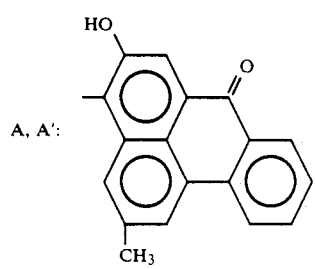
PIGMENT EXAMPLE (2-17)
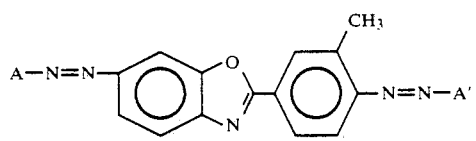
A, A':
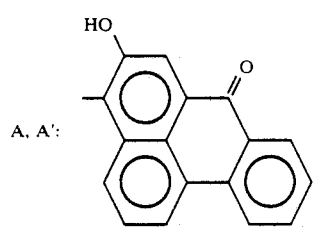
PIGMENT EXAMPLE (2-18)
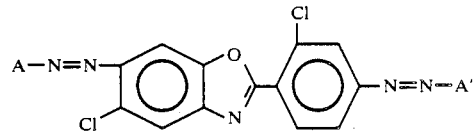
A, A':
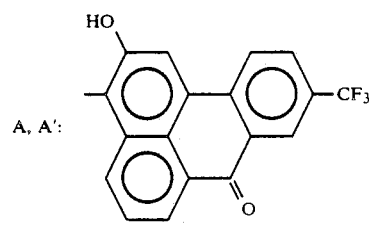
PIGMENT EXAMPLE (2-19)
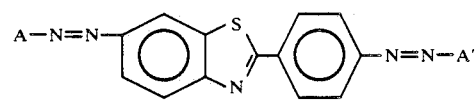
A, A':
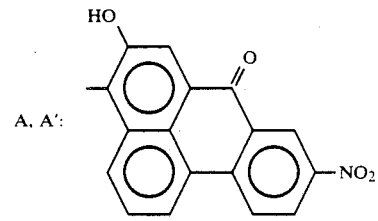
PIGMENT EXAMPLE (2-20)
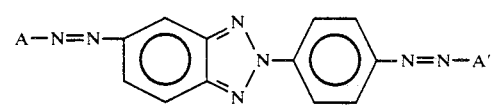

A, A': 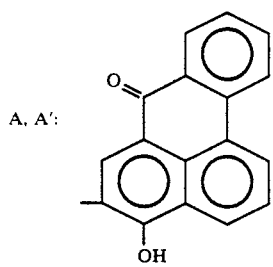
PIGMENT EXAMPLE (2-21)
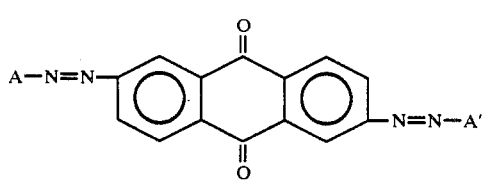
A, A': 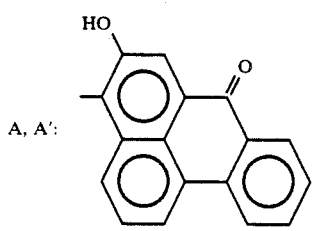
PIGMENT EXAMPLE (2-22)
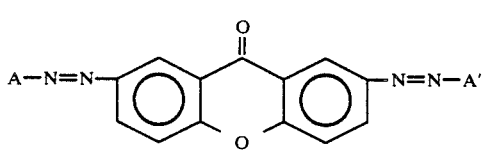
A, A': 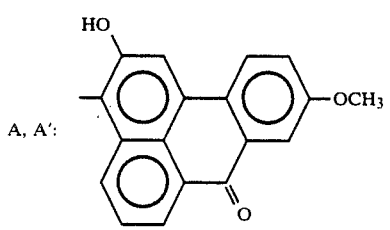
PIGMENT EXAMPLE (2-23)
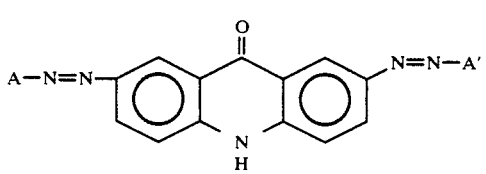
A, A': 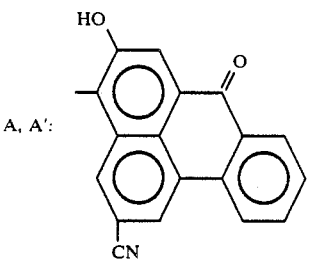
PIGMENT EXAMPLE (2-24)
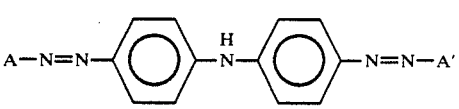
A, A': 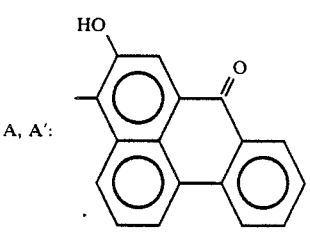
PIGMENT EXAMPLE (2-25)
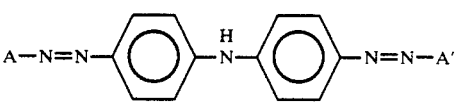
A, A': 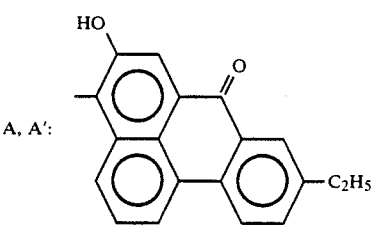
PIGMENT EXAMPLE (2-26)
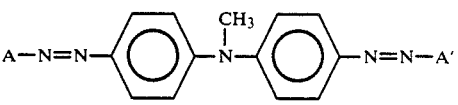
A, A': 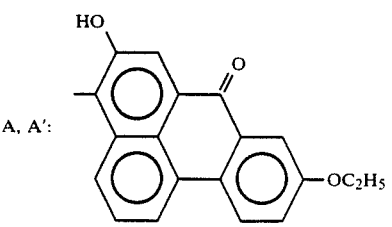

PIGMENT EXAMPLE (2-27)
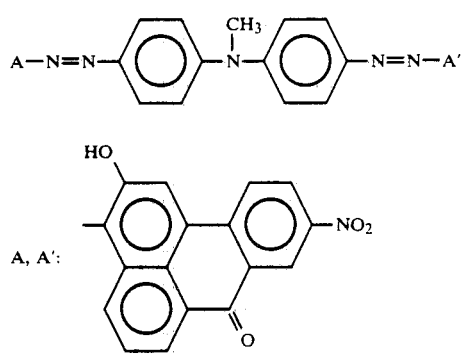
PIGMENT EXAMPLE (2-28)
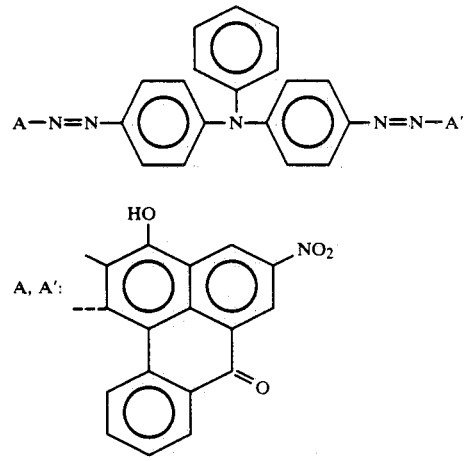
PIGMENT EXAMPLE (3-1)
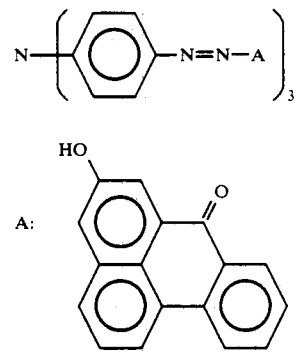
PIGMENT EXAMPLE (3-2)
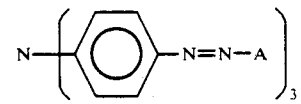
-continued
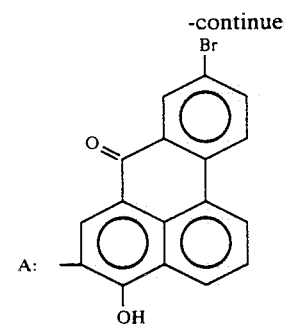
PIGMENT EXAMPLE (3—3)
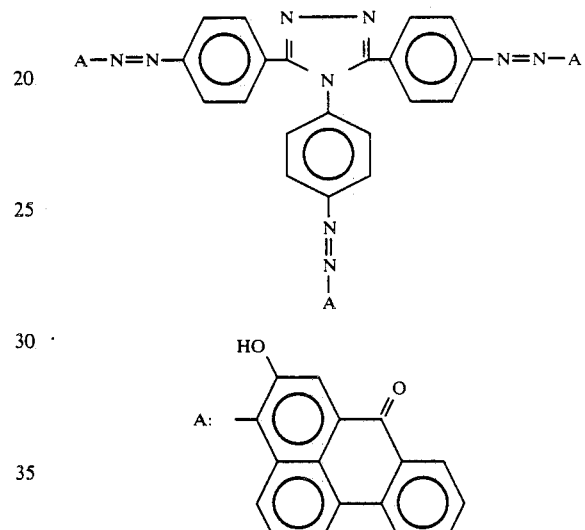
PIGMENT EXAMPLE (4-1)
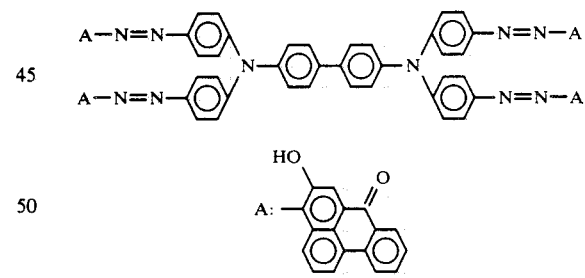
PIGMENT EXAMPLE (4-2)
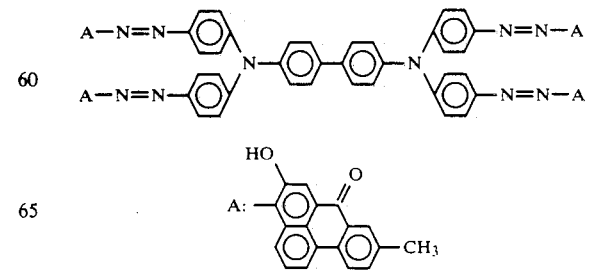

Each of the above-described specified azo pigments used in the present invention can be easily synthesized by diazotizing the corresponding amine by a conventional method and then coupling the diazo product with a coupler residue expressed by Formula (2) in the presence of an alkali in an aqueous system, or by changing the corresponding diazonium salt to a double salt with a borofluoride or a zinc chloride and then coupling the double salt with a coupler residue in the presence of a base such as acetic soda, triethylamine or triethanolamine in an organic solvent such as N,N-dimethylformamide or dimethyl sulfoxide.

A disazo pigment in which another coupler residue than a coupler residue expressed by Formula (2) coexists therewith in its molecule can be synthesized by tetrazotizing the corresponding diamine, isolating the product as the above-described water soluble salt, and then coupling the salt with 1 mole of a coupler residue expressed by Formula (2) and then with 1 mole of another coupler residue. Alternately, such a disazo pigment can be synthesized by protecting one amino group of the corresponding diamine with an acetyl group or the like, diazotizing it, coupling the diazo product with a coupler residue expressed by Formula (2), hydrolyzing the protection group with hydrochloric acid or the like, diazotizing the product, and then coupling the diazo compound produced with another coupler residue.

A trisazo pigment or tetrakisazo pigment in which a coupler residue other than a coupler residue expressed by Formula (2) coexist therewith in its molecule can also be synthesized by the same method as that described above.

SYNTHESIS EXAMPLE (Synthesis of Pigment Example (2-11))

150 ml of water, 20 ml (0.23 mole) of concentrated hydrochloric acid and 8.0 g (0.032 mole) of 2,5-bis(p-aminophenyl)-1,3,4-oxadiazole were charged in a 300-ml beaker which was then cooled to 0° C. A solution obtained by dissolving 4.6 g (0.067 mole) of nitrous soda in 10 ml of water was then dropwise added to the thus-formed mixture within 10 minutes while the temperature of the mixture was controlled to below 5° C.

After the mixture had been agitated for 15 minutes, it was subjected to carbon filtration to obtain a tetrazotized solution. A solution obtained by dissolving 10.5 g (0.096 mole) of borofluoric soda in 90 ml of water was then added dropwise to the tetrazotized solution under agitation. The borofluoride separated was then filtered off, washed with cool water, then with acetonitrile and finally dried at room temperature at reduced pressure.

Yield: 82.05% (11.8 g)

500 ml of DMF was then charged in a 1-liter beaker, and 10.3 g (0.042 mole) of 3-oxybenzanthrone was then dissolved in the DMF. After the thus-formed solution had been cooled to 5° C., 9.0 g (0.020 mole) of the borofluoride obtained was dissolved in the solution, and 5.1 g (0.050 mole) of triethylamine was then added dropwise to the obtained solution within 5 minutes.

After dropwise addition had been completed, the thus-formed solution was agitated for 2 hours, the pigment produced filtered off, washed four times with DMF and then with water, and finally freeze-dried.

Yield: 85.0% (12.9 g)

Melting point: 300° C. or higher (decomposition)

| Elemental analysis: | |
|---|---|
| Calculated value (%) | Measured value (%) |
| C 75.78 | 75.90 |
| H 2.66 | 2.81 |
| N 11.05 | 10.98 |

A film having the thus-formed azo pigment exhibits photoconductivity and can be used in the photosensitive layer of an electrophotographic photosensitive material described below. That is, an azo pigment of the present invention is employed in an electrophotographic photosensitive material which is formed by coating on a conductive substrate an appropriate binder in which the above-described azo pigment is dispersed.

In a preferred example of the present invention a photoconductive film containing one of the above-described azo pigments is used as a charge generation substance in an electrophotoductive photosensitive material which has a photosensitive layer of a divided-function type divided into a charge generation layer and a charge transport layer.

It is preferable for a charge generation layer to contain a charge generation substance in as large an amount as possible in order to obtain a sufficient degree of absorbance and to be a thin film layer having a thickness of, for example, 5 μm or less, preferably 0.01 μm to 1 μm. This thin film layer causes the charge carriers generated to be effectively transported to the boundary between the charge generation layer and the charge transport layer or the conductive substrate.

A binder which can be used for forming such a charge generation layer by coating can be selected from a wide range of insulating resins and organic photoconductive polymers such as poly-N-vinylcarbazole, polyvinylanthracene, polyvinylpyrene and the like. Preferable examples of binders include insulating resins such as polyvinyl butyral, polyvinylbenzal, polyacrylates such as polycondensate of bisphenol A and phthalic acid and the like, polycarbonate, polyester, phenoxy resin, polyvinyl acetate, acrylic resin, polyacrylamide, polyamide, polyvinyl pyrrolidone and the like. The amount of the resin contained in the charge generation layer is 80% by weight or less, preferably 40% by weight or less.

The solvent in which the resin is dissolved is preferably selected from the solvents described below which do not allow the charge transport layer and a undercoat layer to dissolve therein, depending upon the type of resin used.

Examples of organic solvents that may be used include alcohols such as methanol, ethanol, isopropyl alcohol and the like; ketones such as acetone, methyl ethyl ketone, cyclohexanone and the like; amides such as N,N-dimethylformamide, N,N-dimethylacetoamine, and the like; sulfoxides such as dimethyl sulfoxide and the like; ethers such as tetrahydrofuran, dioxane, ethylene glycol monomethyl ether and the like; esters such as methyl acetate, ethyl acetate and the like; aliphatic halogenated hydrocarbons such as chloroform, methylene chloride, dichloroethylene, carbon tetrachloride, trichloroethylene and the like; and aromatic solvents such as benzene, toluene, xylene, ligroin, monochlorobenzene, dichlorobenzene and the like.

Examples of methods of coating that may be used include dip-coating, spray coating, spinner coating, bead coating, Mayer bar coating, blade coating, roller coating and flood coating methods and the like.

Drying is preferably performed by allowing the film to set to touch at room temperature or by heat drying. The heat drying can be performed in a stationary state or under blast at a temperature within the range of 30° to 200° C. for 5 minutes to 2 hours.

The charge transport layer is electrically connected to the charge generation layer and functions to receive the charge carriers injected from the charge generation layer in the presence of an electric field, as well as transporting the charge carriers to the surface.

The charge transport layer may be laminated on the charge generation layer or disposed under it.

Charge transporting substances involve electron transporting substances and positive hole transporting substances. Examples of electron transporting substances include electron attractive substances such as chloranil, tetracyanoethylene, tetracyanoquinodimethane, 2,4,5,7-tetranitro-9-fluorenone, 2,4,5,7-tetranitroxanthone, 2,4,8trinitrothioxantone and the like; and polymers comprising such electron attractive substances.

Examples of positive hole transporting substances include hydrazone compounds such as pyrene, N-ethyl-carbazole, N-methyl-N-phenylhydrazino-3-methylidene-9-ethylcarbazole, N,N-diphenylhydrazino-3-methylidene-10-ethylphenothiazine, p-diethylaminobenzaldehyde-N,N-diphenylhydrazone, p-diethylbenzaldehyde-3-methylbenzthiazolino-2-hydrazone and the like; pyrazoline compounds such as 2,5-bis(p-diethylaminophenyl)-1,3,4-oxadiazole, 1-phenyl-3-(p-diethylaminostyryl)-5-(p-diethylaminophenyl) pyrazoline, 1-[pyridyl(3)]-3-(p-diethylaminostyryl)-5-(p-diethylaminophenyl) pyrazoline, 1[pyridyl (2)]-3-(p-diethylaminostyryl)-4-methyl-5-(p-diethylaminophenyl) pyrazoline, spiropyrazoline and the like; styryl compounds such as a-phenyl-4-N,N-diphenylaminostilbene, N-ethyl-3-(α-phenylstyryl) carbazole, diphenylaminostilbe 9-dibenzylaminobenzylidene-9H-fluorenone, 5-p-ditolylaminobenzylidene-5H-dibenzo[a,b]cycloheptene and the like; oxazole compounds such as 2-(p-diethylaminostyryl)-6-diethylaminobenzoxazole, 2-(p-diethylaminophenyl)-4-(p-dimethylaminophenyl)-5-(2-chlorophenyl) oxazole and the like; thiazole compounds such as 2-(p-diethylaminostyryl)-6-diethylaminobenzothiazole and the like; triarylmethane compounds such as bis(4-diethylamino-2-methylphenyl)-phenylmethane and the like; polyaryl alkanes such as 1,1-bis(4-N,N-diethylamino-2-methylphenyl) heptane, 1,1,2,2-tetrakis(4-N,N-dimethylamino-2-methylphenyl) ethane and the like; triphenylamine; poly-N-vinylcarbazole; polyvinyl pyrene; polyvinyl anthracene; polyvinyl acridine; poly-9-vinyl anthracene; pyreneformaldehyde resin; ethylcarbazole formaldehyde resin and the like. Apart from these organic electron transporting substances, inorganic materials such as selenium, seleniumtellurium, amorphous silicon, cadmium sulfide and the like can be used.

These charge transporting substances can also be used in combinations of one or more substances.

When a charge transporting substance has no film-forming properties, a film can be formed by selecting an appropriate binder. Examples of resins that may be used as binders include insulating resins such as acrylic resin, polyacrylate, polyester, polycarbonate, polystyrene, acrylonitrile-styrene copolymer, acrylonitrile-butadiene copolymer, polyvinyl butyral, polyvinyl formal, polysulfone, polyacrylamide, polyamide, chlorinated rubber and the like; and organic photoconductive polymers such as poly-N-vinylcarbazole, polyvinyl pyrene and the like.

The thickness of the charge transport layer is preferably within the range of 5 to 50 μm, more preferably 8 to 20 μm. The formation of the charge transport layer by coating can appropriately utilizes one of the above-described coating methods.

The photosensitive layer comprising the charge generation layer and the charge transport layer is provided on the conductive substrate. Examples of materials that may be used in the conductive substrate include metals such as aluminum, aluminum alloys, stainless steel, which all enable the substrate itself to have conductivity; plastics having films formed thereon by vapor deposition of aluminum, aluminum alloys, indium oxide, tin oxide, indium oxide-tin oxide alloy and the like; substrates formed by coating conductive particles (for example, carbon black, silver particles and the like) together with an appropriate binder on the above-described metals and plastics; substrates formed by impregnated conductive particles in plastics and papers; and plastics comprising conductive polymers; and the like.

An undercoating layer having a barrier function and an adhesive function can also be interposed between the conductive substrate and the photosensitive layer.

Such an undercoating layer can be formed by using casein, polyvinyl alcohol, nitrocellulose, ethylene-acrylic acid copolymer, polyamide (nylon 6, nylon 66, nylon 610, copolymer nylon, alkoxymethylated nylon or the like) polyurethane, gelatine, aluminum oxide or the like.

The thickness of the undercoating layer is preferably 0.1 to 5 μm, more preferably 0.5 to 3 μm.

Another example of the electrophotographic photosensitive material of the present invention in a material in which one of the above-described azo pigments and the charge transport substance are contained in the same layer.

In this case, it is possible to use the above-described charge transporting substances as well as a charge transfer complex composed of poly-N-vinylcarbazole and trinitrofluorenone.

The electrophotographic photosensitive material in this example can be formed by dispersing the azo pigment and the charge transfer complex in a tetrahydrofuran solution in which polyester is dissolved and then forming a film.

The above-described azo pigments of the present invention may be either amorphous or crystalline.

As occasion demands, it is possible to combine pigments having different levels of light absorption in order to increase the sensitivity of the photosensitive material, to combine two or more of the azo pigments in order to obtain a panchromatic photosensitive material, or to combine the azo pigments with a charge generation substance selected from other known dyes and pigments.

The electrophotographic photosensitive material of the present invention can be widely used in an electrophotographic copying machine, as well as in fields utilizing electrophotography such as laser beam printers, CRT printers, LED printers, liquid crystal printers, laser plate making and so on.

EXAMPLE 1

A solution obtained by dissolving 5 g of methoxymethylated nylon (number average molecular weight, 32000) and 10 g of alcohol-soluble copolymer nylon (number average molecular weight, 29000) in 95 g of methanol was coated on an aluminum substrate using a Mayer bar. After drying, an undercoating layer with a thickness of 1 μm was provided on the substrate.

5g of the above-describe Pigment Example (1—1) was then added to a solution formed by dissolving 2 g of butyral resin (butyral group, 63 mol%) in 95 ml of cyclohexane, and then dispersing the pigment therein by a sand mill for 20 hours. The thus-formed dispersion was then coated on the under coat layer previously formed so as to have a thickness of 0.2 μm after drying using a Mayer bar to form a charge generation layer.

5 g of a hydrazine compound having the structure expressed by the following:

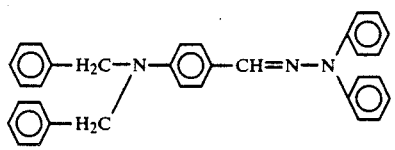

and 5 g of polymethylmethacrylate (number average molecular weight, 100,000) were then dissolved in 40 ml of toluene. The thus-formed solution was then coated on the charge generation layer using a Mayer bar so as to have a thickness of 20 μm and then dried to form a charge transport layer, whereby the electrophotographic photosensitive material of Example 1 was formed.

EXAMPLES 2 to 12

Electrophotographic photosensitive materials of Examples 2 to 12 were formed by the same method as that employed in Example 1 with the exception that the pigment examples described below were respectively used as azo pigments in place of Pigment Example (1—1).

Each of the thus-formed electrophotographic photosensitive materials was subjected to corona discharge at $-5$ KV by a static method using a static copying paper tester (Model SP-428 produced by Kawaguchi Electric Co., Ltd.). After each of the materials had been allowed to stand for 1 second in a dark place, the charge characteristics thereof were examined by exposure to light of 10 lux.

The charge characteristics were examined by measuring the surface potential ($V_0$) and the exposure ($E_{\frac{1}{2}}$) necessary to attenuate the potential to half during dark attenuation for 1 second. The results obtained are shown below.

| Example 1 | Pigment Example | $V_0$ (-V) | $E_{\frac{1}{2}}$ (lux · sec) |
|---|---|---|---|
| 1 | 1-1 | 680 | 3.4 |
| 2 | 2-2 | 710 | 1.9 |
| 3 | 2-4 | 700 | 1.6 |
| 4 | 2-8 | 690 | 1.8 |
| 5 | 2-9 | 690 | 1.7 |
| 6 | 2-11 | 705 | 1.3 |
| 7 | 2-12 | 700 | 1.5 |
| 8 | 2-17 | 690 | 1.8 |
| 9 | 2-19 | 710 | 2.3 |
| 10 | 2-21 | 710 | 2.5 |
| 11 | 2-24 | 700 | 2.8 |
| 12 | 3-1 | 690 | 2.1 |

COMPARATIVE EXAMPLES 1 AND 2

Photosensitive materials were formed by the same method as that employed in Example 1 with the exception that azo pigments having the structures described below were used in place of the azo pigment used in Example 1. The charge characteristics of the materials formed were then examined by the same method as in Example 1.

COMPARATIVE EXAMPLE 1

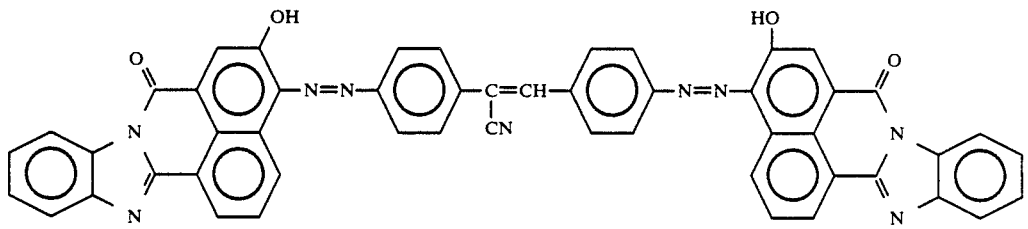

$V_o$: $-590$ V
$E_{\frac{1}{2}}$: 3.9 lux·sec

COMPARATIVE EXAMPLE 2

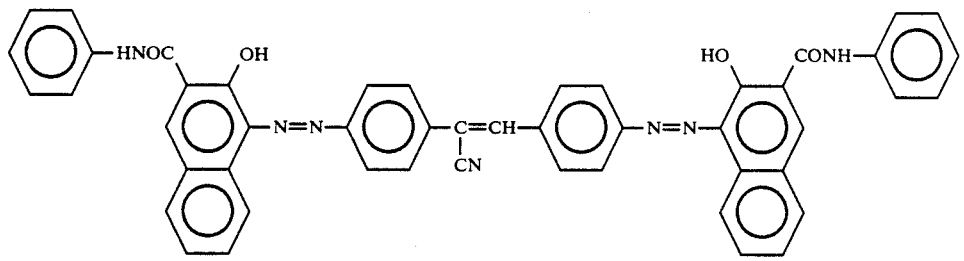

$V_o$: $-575$ V
$E_{\frac{1}{2}}$: 4.4 lux·sec

As can been seen from the above-described results, all the electrophotographic photosensitive materials containing the particular azo pigments of the present invention have satisfactory charge properties and excellent sensitivity.

EXAMPLES 13 to 17

The changes in potential in a light portion and dark portion were measured during repeated use using each of the electrophotographic photosensitive materials formed in Examples 2, 4, 11 and 19.

Measurements were performed by a method in which each of the electrophotographic photosensitive material was applied to the cylinder of an electrophotographic copying machine provided with a corona discharger of −5.6 V, an exposure optical system, a developing machine, a transfer charger, an antistatic exposure optical system and a cleaner. This copying machine was so arranged that an image could be obtained on a transfer paper following the drive of the cylinder.

The change in dark portion potential ($\Delta V_D$) and the change in light portion potential ($\Delta V_L$) were measured after each of the materials had been used 5,000 times using the copying machine at the initial dark portion potential ($V_D$) and initial light portion potential ($V_L$) which were respectively set at −700V and −200V. The results obtained are shown below.

The minus sign of each of the changes in potential represents a decrease in potential, and the plus sign thereof represents an increase in potential.

| Example | Azo pigment (Example) | $\Delta V_D$ (V) | $\Delta V_L$ (V) |
| --- | --- | --- | --- |
| 13 | 2 | −15 | +20 |
| 14 | 4 | −10 | +15 |
| 15 | 8 | −30 | +25 |
| 16 | 11 | −5 | +15 |
| 17 | 19 | −25 | +30 |

COMPARATIVE EXAMPLES 3, 4

The changes in potential of each of the electrophotographic photosensitive materials formed in Comparative Examples 1 and 2 were measured by the same method as that employed in Example 13 when the materials were repeatedly used. The results obtained are given below.

| Comparative Example | Azo pigment (Comparative Example) | $\Delta V_D$ (V) | $\Delta V_L$ (V) |
| --- | --- | --- | --- |
| 3 | 1 | −65 | +55 |
| 4 | 2 | −90 | +60 |

As can be seen from the above-described results, each of the electrophotographic photosensitive materials of the present invention exhibits a low degree of change in potential during repeated use.

EXAMPLE 18

A polyvinyl alcohol film with a thickness of 0.5 μm was formed on the aluminum surface of a polyethylene terephthalate film on which aluminum was vapor-deposited.

A dispersion of the disazo pigment used in Example 6 was then coated on the thus-formed polyvinyl alcohol film using a Mayer bar so as to have a thickness of 0.2 μm, and was then dried to form a charge generation layer.

A solution obtained by dissolving 5 g of a styryl compound having the structure described below and 5 g of a polyacrylate (a polycondensate of bisphenol A and terephthalic acid-isophthalic acid) in 40 ml of tetrahydrofuran was then coated on the charge generation layer formed so as to have a thickness of 20 μm after drying. The film was then dried to form a charge transport layer.

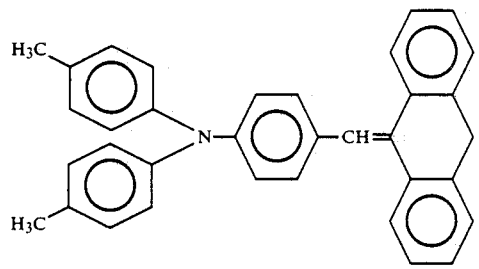

The charge characteristics and durability characteristics of the thus-formed electrophotographic photosensitive material were measured by the same methods as those employed in Examples 1 and 13, respectively.
$V_0$: −700 V
$E_{\frac{1}{2}}$: 1.0 lux·sec
$\Delta V_D$: +5 V
$\Delta V_L$: +5 V

EXAMPLE 19

An electrophotographic photosensitive material was formed by coating a charge generation layer and a charge transport layer in the order reverse to that of the electrophotographic photosensitive material formed in Example 6. The charge characteristics of the thus-formed material were evaluated by the same method as that employed in Example 1 with the exception that the polarity of charge was positive.
$V_0$: +685 V
$E_{\frac{1}{2}}$: 1.5 lux·sec

EXAMPLE 20

A solution obtained by dissolving 5 g of 2,4,7-trinitro-9-fluorenone and 5 g of poly-4,4′-dioxydiphenyl-2,2-propane carbonate (molecular weight, 300000) in 70 ml of benzene was coated on the charge generation layer formed in Example 6 so as to have a thickness of 15 μm after drying. The resulting film was then dried.

The charge characteristics of the thus-formed electrophotographic photosensitive material were evaluated by the same method as that employed in Example 1 with the exception that the polarity of charge was positive.
$V_0$: +640 V
$E_{\frac{1}{2}}$: 3.8 lux·sec

EXAMPLE 21

A charge transfer complex compound was prepared by dissolving 5 g of 2,4,7-trinitro-9-fluorenone and 5 g of poly-N-vinylcarbazole (number average molecular weight, 300000) in 70 ml of tetrahydrofuran.

The thus-formed charge transfer complex compound and 1 g of Pigment Example (2-4) were added to a solution obtained by dissolving 5 g of polyester (trade name, Vilon, produced by Toyo Boseki Co., Ltd.) in 70 ml of tetrahydrofuran so as to be dispersed therein. The thus-formed dispersion was then coated on the undercoating layer formed in Example 1 and then dried to form a photosensitive layer having a thickness of 16 μm.

The charge characteristics of the thus-formed electrophotographic photosensitive material were evaluated by the same method as that employed in Example 1 with the exception that the polarity of charge was positive.

$V_0$: +680 V
$E_{\frac{1}{2}}$: 4.1 lux·sec

What is claimed is:

1. An electrophotographic photosensitive material comprising a photosensitive layer which is formed on a conductive substrate and which contains an azo pigment expressed by Formula (1) described below, wherein at least one of Cp in said Formula (1) is a coupler residue expressed by Formula (2) described below:

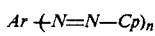  (1)

wherein Ar is an aromatic hydrocarbon or aromatic heterocyclic group, Cp is a coupler reside having a phenolic hydroxyl group, and n is an integer of 1, 2, 3 or 4

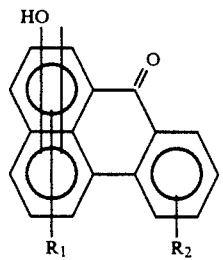  (2)

wherein $R_1$ and $R_2$ are each a hydrogen atom, an alkyl group, an alkoxy group, a halogen atom, a halomethyl group, a cyano group or a nitro group.

2. An electrophotographic photosensitive material according to claim 1, wherein said azo pigment is expressed by the following Formula (3):

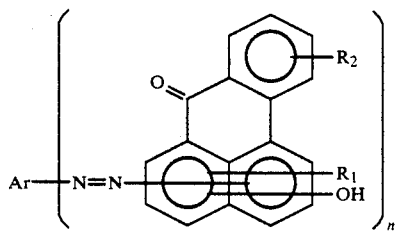  (3)

wherein Ar, $R_1$, $R_2$ and n each is the same as in claim 1.

3. An electrophotographic photosensitive material according to claim 1, wherein said photosensitive layer contains a charge transport substance.

4. An electrophotographic photosensitive material according to claim 1, wherein said photosensitive layer has a laminar structure comprising a charge generation layer and a charge transport layer.

5. An electrophotographic photosensitive material according to claim 3, wherein said charge transport substance is an organic charge transport substance.

6. An electrophotographic photosensitive material according to claims 1 and 2, wherein Ar has a structure selected from the group consisting of the following:

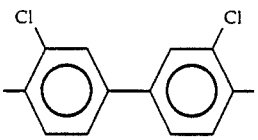

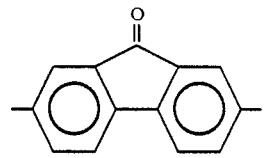

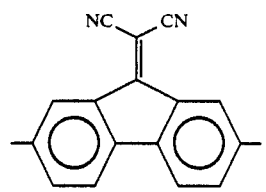

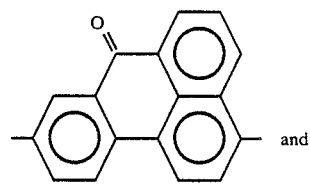

and

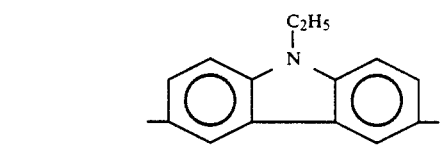

7. An electrophotographic photosensitive material according to claims 1 or 2, wherein Ar is selected from the group consisting of:

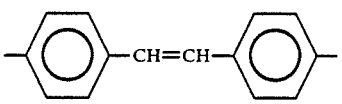

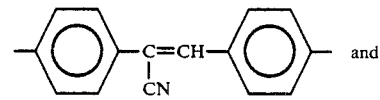 and

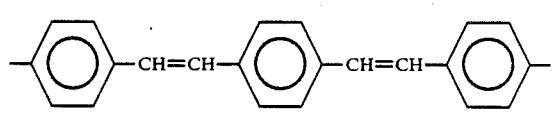

8. An electrophotographic photosensitive material according to claims 1 or 2, wherein Ar is selected from the group consisting of:

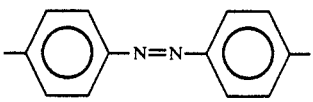

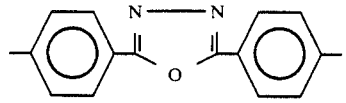

-continued

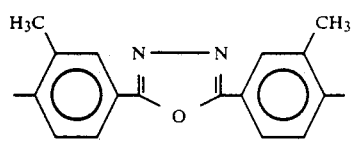

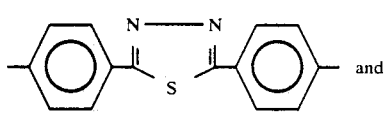
and

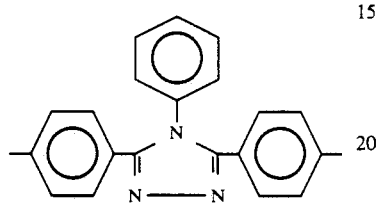

9. An electrophotographic photosensitive material according to claims 1 or 2, wherein Ar is selected from the group consisting of:

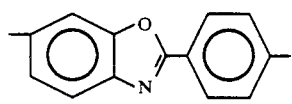

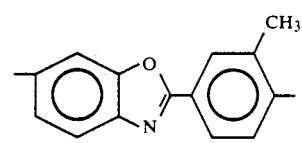

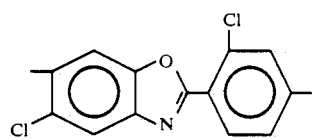

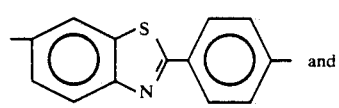
and

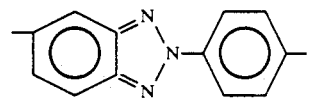

10. An electrophotographic photosensitive material according to claims 1 or 2, wherein Ar is selected from the group consisting of:

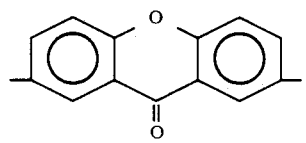

-continued

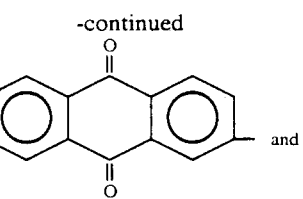
and

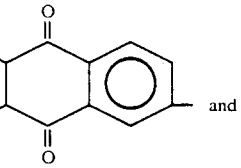

11. An electrophotographic photosensitive material according to claims 1 or 2, wherein Ar is selected from the group consisting of:

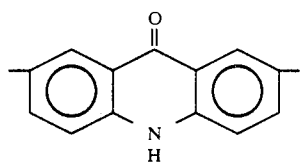

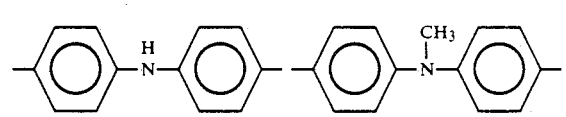

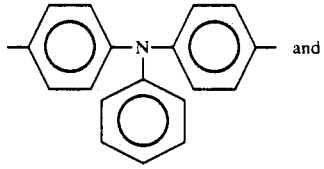
and

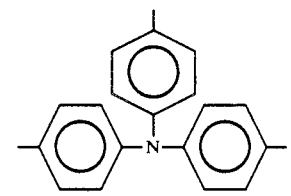

12. An electrophotographic photosensitive material according to claims 1 and 2, wherein Ar is selected from the group consisting of:

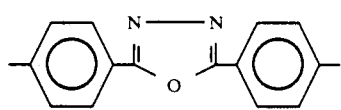

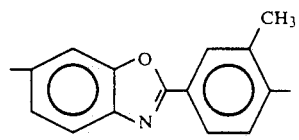

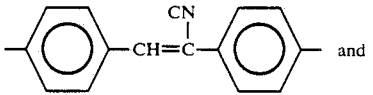
and

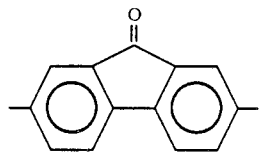

* * * * *